United States Patent
Chen et al.

(10) Patent No.: US 8,255,064 B2
(45) Date of Patent: Aug. 28, 2012

(54) REMOTE CNC MACHINE CONTROL SWITCH

(75) Inventors: Yen-Ku Chen, Taipei Hsien (TW); Yueh-Hsun King, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 594 days.

(21) Appl. No.: 12/471,473

(22) Filed: May 26, 2009

(65) Prior Publication Data

US 2010/0292814 A1 Nov. 18, 2010

(30) Foreign Application Priority Data

May 12, 2009 (CN) .......................... 2009 1 0302235

(51) Int. Cl.
*G05B 11/01* (2006.01)
*G06F 19/00* (2011.01)

(52) U.S. Cl. ............ 700/19; 700/180; 700/192; 700/65; 700/66; 700/114

(58) Field of Classification Search ................ 700/19
See application file for complete search history.

(56) References Cited

U.S. PATENT DOCUMENTS

| | | | | |
|---|---|---|---|---|
| 4,120,583 A * | 10/1978 | Hyatt | ............................. | 700/192 |
| 4,199,814 A * | 4/1980 | Rapp et al. | .................... | 700/180 |
| 4,513,379 A * | 4/1985 | Wilson et al. | ................. | 700/181 |
| 4,514,814 A * | 4/1985 | Evans | ............................ | 700/189 |
| 4,531,182 A * | 7/1985 | Hyatt | ............................. | 700/180 |
| 4,555,610 A * | 11/1985 | Polad et al. | .................... | 700/180 |
| 4,653,360 A * | 3/1987 | Compton | ....................... | 700/188 |
| 4,745,557 A * | 5/1988 | Pekar et al. | .................... | 700/188 |
| 4,866,360 A * | 9/1989 | Kolomeets et al. | ............ | 318/577 |
| 4,974,165 A * | 11/1990 | Locke et al. | .................... | 700/192 |
| 4,990,840 A * | 2/1991 | Migda | ............................ | 700/188 |
| 5,043,644 A * | 8/1991 | Sasaki et al. | ................... | 700/179 |
| 5,070,288 A * | 12/1991 | Ikeda et al. | ..................... | 318/618 |
| 5,081,407 A * | 1/1992 | Kono et al. | ..................... | 700/192 |
| 5,091,861 A * | 2/1992 | Geller et al. | .................... | 700/192 |
| 5,124,621 A * | 6/1992 | Kawamura et al. | ............ | 318/569 |
| 5,144,550 A * | 9/1992 | Sasaki et al. | ...................... | 700/87 |
| 5,172,040 A * | 12/1992 | Sasaki et al. | ................... | 318/571 |
| 5,181,178 A * | 1/1993 | Sasaki et al. | ................... | 700/169 |
| 5,200,680 A * | 4/1993 | Sasaki et al. | ................... | 318/571 |
| 5,229,698 A * | 7/1993 | Minnich et al. | ................ | 700/189 |
| 5,239,159 A * | 8/1993 | Masuda | .................... | 219/121.78 |
| 5,260,879 A * | 11/1993 | Sasaki et al. | ................... | 700/193 |
| 5,265,027 A * | 11/1993 | Sasaki et al. | ................... | 700/194 |
| 5,282,144 A * | 1/1994 | Kawamura et al. | ............ | 700/189 |

(Continued)

*Primary Examiner* — Mohammad Ali
*Assistant Examiner* — Kelvin Booker
(74) *Attorney, Agent, or Firm* — Altis Law Group, Inc.

(57) ABSTRACT

A computer numerical control (CNC) machine includes a case, a communication plug, a first switch, a number of second switches, and a control circuit. The control circuit includes a first switch control unit to receive a first switch signal from the first switch, a second switch control unit to receive second switch signals from the second switches, a control unit, a command signal converting unit, a pulse signal generating unit, and an operation signal output unit. The control unit receives the first and second switch signals, determines the work mode of the CNC machine according to the first switch signal, and convert the second switch signals to command signals. The command signal converting unit converts the command signals into operation signals. The pulse signal generating unit generates pulse signals. The operation signal output unit outputs the operation signals and the pulse signals to the CNC machine via the communication plug.

15 Claims, 5 Drawing Sheets

U.S. PATENT DOCUMENTS

| | | | | |
|---|---|---|---|---|
| 5,289,367 A * | 2/1994 | Sasaki et al. | | 700/32 |
| 5,313,861 A * | 5/1994 | Ikeda | | 700/170 |
| 5,317,501 A * | 5/1994 | Hilpert | | 700/3 |
| 5,317,518 A * | 5/1994 | Fujita et al. | | 700/184 |
| 5,357,450 A * | 10/1994 | Hemmerle et al. | | 700/192 |
| 5,438,522 A * | 8/1995 | Crovella | | 700/189 |
| 5,465,215 A * | 11/1995 | Strickland et al. | | 700/180 |
| 5,471,395 A * | 11/1995 | Brien | | 700/186 |
| 5,475,602 A * | 12/1995 | Otsuki et al. | | 700/189 |
| 5,539,972 A * | 7/1996 | Sasaki et al. | | 29/456 |
| 5,568,028 A * | 10/1996 | Uchiyama et al. | | 318/566 |
| 5,587,915 A * | 12/1996 | Nagatomi | | 700/177 |
| 5,599,142 A * | 2/1997 | Fujimoto et al. | | 408/10 |
| 5,604,677 A * | 2/1997 | Brien | | 700/186 |
| 5,631,851 A * | 5/1997 | Tanaka et al. | | 702/33 |
| 5,682,319 A * | 10/1997 | Boland et al. | | 700/189 |
| 5,687,074 A * | 11/1997 | Tanaka et al. | | 700/26 |
| 5,822,212 A * | 10/1998 | Tanaka et al. | | 700/174 |
| 5,931,070 A * | 8/1999 | Miyajima et al. | | 83/39 |
| 5,940,292 A * | 8/1999 | Kurakake et al. | | 700/56 |
| 5,977,736 A * | 11/1999 | Nakazato | | 318/568.17 |
| 6,019,554 A * | 2/2000 | Hong | | 700/177 |
| 6,242,880 B1 * | 6/2001 | Hong | | 700/189 |
| 6,317,646 B1 * | 11/2001 | de Caussin et al. | | 700/173 |
| 6,353,301 B1 * | 3/2002 | Niwa | | 318/569 |
| 6,427,098 B1 * | 7/2002 | Alverson et al. | | 700/180 |
| 6,442,444 B2 * | 8/2002 | Matsubara et al. | | 700/95 |
| 6,445,959 B1 * | 9/2002 | Poth | | 700/28 |
| 6,456,896 B1 * | 9/2002 | Ito et al. | | 700/193 |
| 6,470,225 B1 * | 10/2002 | Yutkowitz | | 700/188 |
| 6,512,961 B1 * | 1/2003 | Fukaya et al. | | 700/174 |
| 6,625,498 B1 * | 9/2003 | Kurakake et al. | | 700/58 |
| 6,665,580 B1 * | 12/2003 | Susnjara | | 700/160 |
| 6,757,583 B2 * | 6/2004 | Giamona et al. | | 700/189 |
| 6,775,586 B2 * | 8/2004 | Shibata et al. | | 700/189 |
| 6,826,434 B1 * | 11/2004 | Chang | | 700/86 |
| RE39,907 E * | 11/2007 | Hong | | 700/189 |
| 7,292,913 B2 * | 11/2007 | Tokutake et al. | | 700/264 |
| 7,437,211 B1 * | 10/2008 | Haas et al. | | 700/188 |
| 7,693,588 B2 * | 4/2010 | Hong et al. | | 700/189 |
| 7,769,481 B2 * | 8/2010 | Tang et al. | | 700/179 |
| 7,774,088 B2 * | 8/2010 | Yamada | | 700/189 |
| 7,792,604 B2 * | 9/2010 | Hong et al. | | 700/189 |
| 7,860,601 B2 * | 12/2010 | Piggott et al. | | 700/192 |
| 8,112,173 B2 * | 2/2012 | Katoh et al. | | 700/192 |
| 2002/0004688 A1 * | 1/2002 | Kojima et al. | | 700/193 |
| 2002/0010520 A1 * | 1/2002 | Matsubara et al. | | 700/95 |
| 2003/0120376 A1 * | 6/2003 | Shibata et al. | | 700/189 |
| 2003/0195642 A1 * | 10/2003 | Ragnini | | 700/56 |
| 2004/0002778 A1 * | 1/2004 | Giamona et al. | | 700/189 |
| 2007/0021861 A1 * | 1/2007 | Murata et al. | | 700/180 |
| 2007/0185608 A1 * | 8/2007 | Ragnini | | 700/180 |
| 2008/0234855 A1 * | 9/2008 | Haas et al. | | 700/180 |
| 2009/0164039 A1 * | 6/2009 | Jung et al. | | 700/117 |
| 2009/0261990 A1 * | 10/2009 | Wu et al. | | 341/20 |
| 2009/0292389 A1 * | 11/2009 | Jung et al. | | 700/117 |
| 2009/0312862 A1 * | 12/2009 | Fagan | | 700/192 |
| 2010/0063608 A1 * | 3/2010 | Miller | | 700/185 |

* cited by examiner

REMOTE CNC MACHINE CONTROL SWITCH

BACKGROUND

1. Technical Field

The present disclosure relates to control apparatuses and, particularly, to a control apparatus used in a computer numerical control (CNC) machine.

2. Description of Related Art

Manual pulse generators are devices normally associated with computer numerical control (CNC) machines or other devices involved in positioning. A manual pulse generator generates electrical pulse signals sent to a CNC machine and then the CNC machine moves a predetermined distance for each pulse signal.

Referring to FIG. 1, a related-art manual pulse generator used in a CNC machine includes a rotor 110, an axis selector 120 to select one of the axes X, Y, and Z, and a magnification selector 130 to control a moving speed of the CNC machine, such as X1 meaning the moving speed of the CNC machine not being magnified, X10 meaning the moving speed of the CNC machine being magnified 10 times, and X100 meaning the moving speed of the CNC machine being magnified 100 times. The rotor 110 is to generate pulse signals to control the CNC machine. However, the related-art pulse generator is inconvenient to operate.

DETAILED DESCRIPTION

Figure 1:
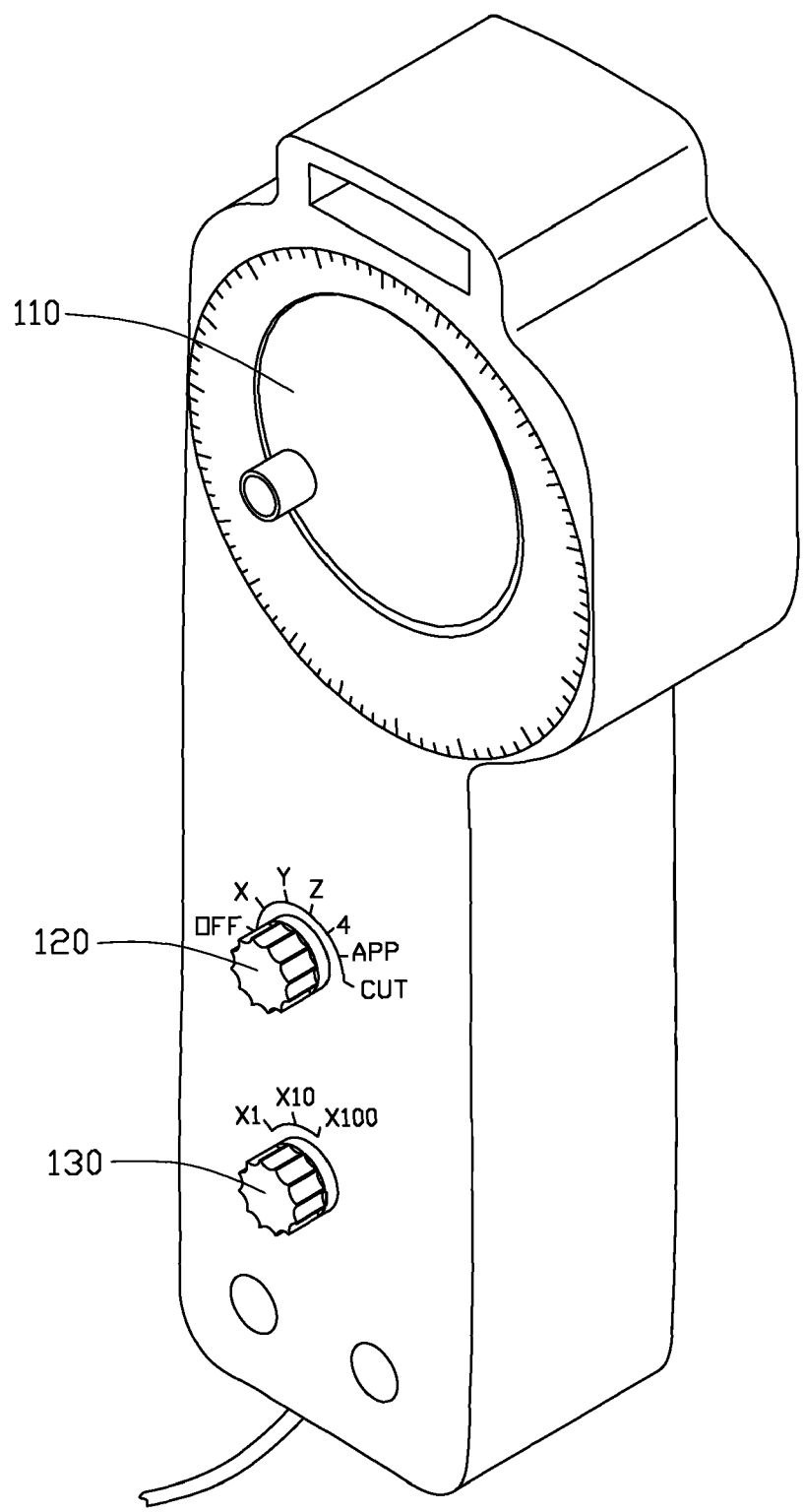
FIG. 1 is a schematic, isometric view of a related-art manual pulse generator.
Figure 2:
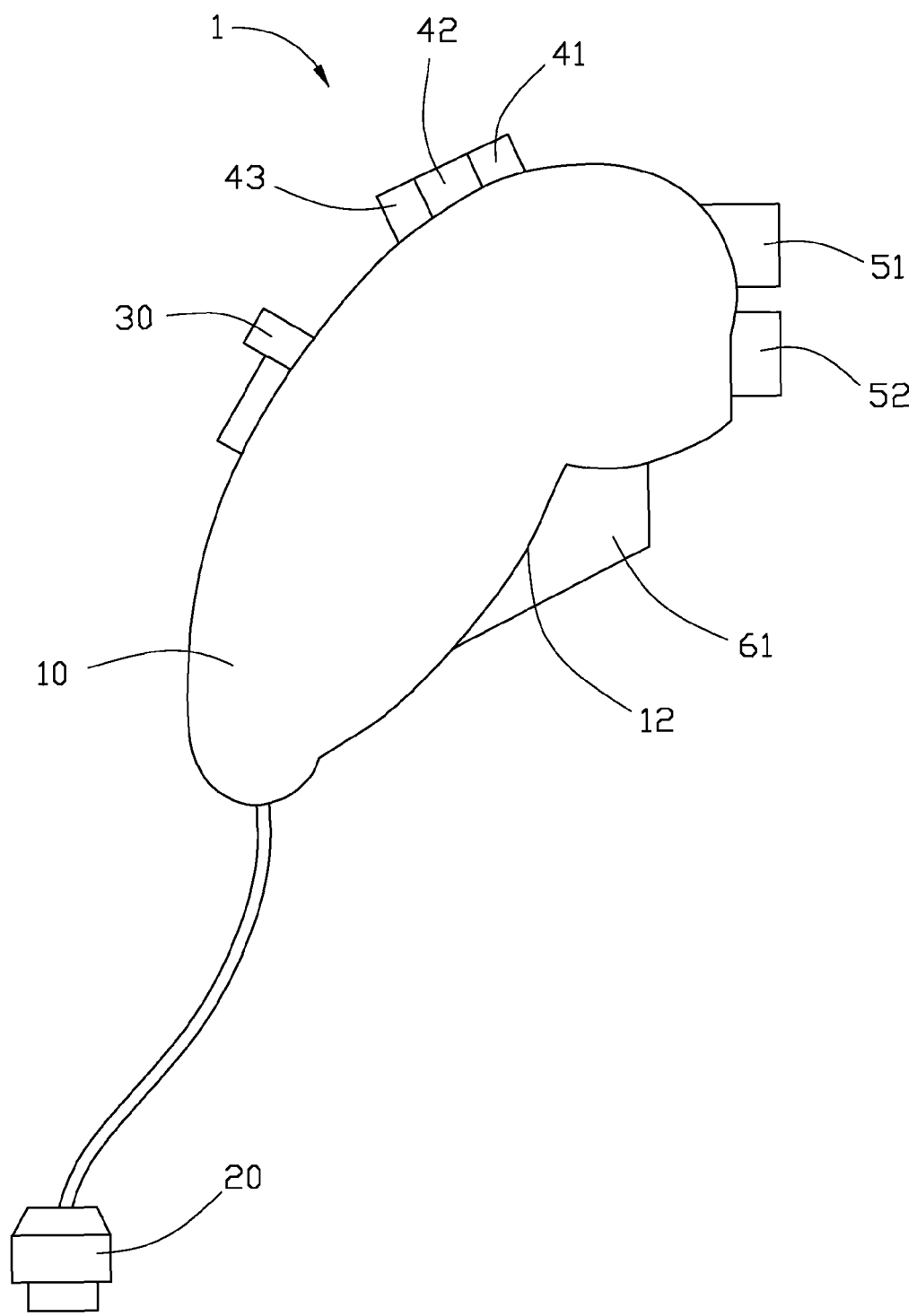
FIG. 2 is a schematic view of an exemplary embodiment of a CNC machine control apparatus.
Figure 3:
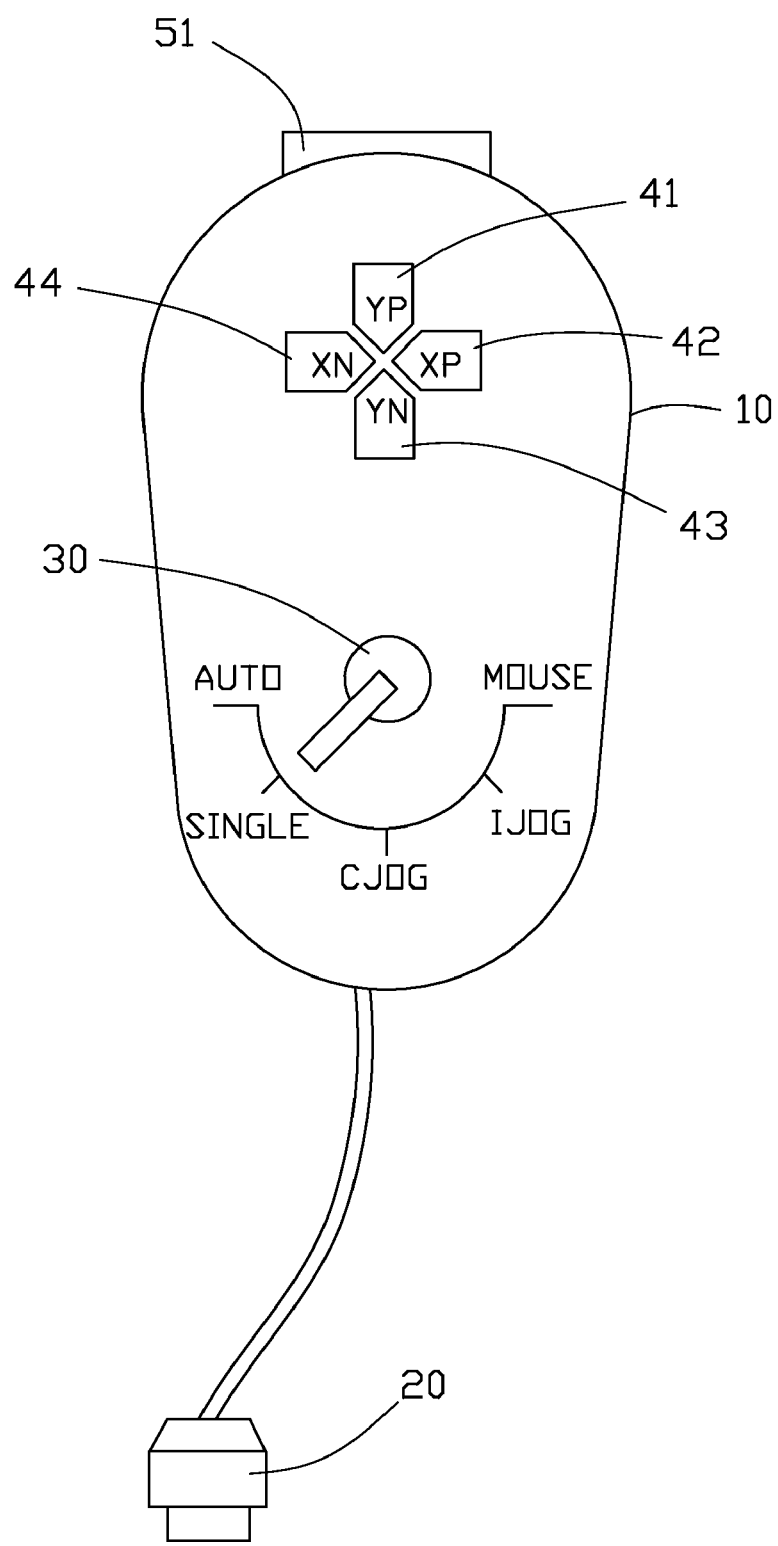
FIG. 3 is a schematic view of the CNC machine control apparatus of FIG. 1, but viewed from another perspective.
Figure 4:
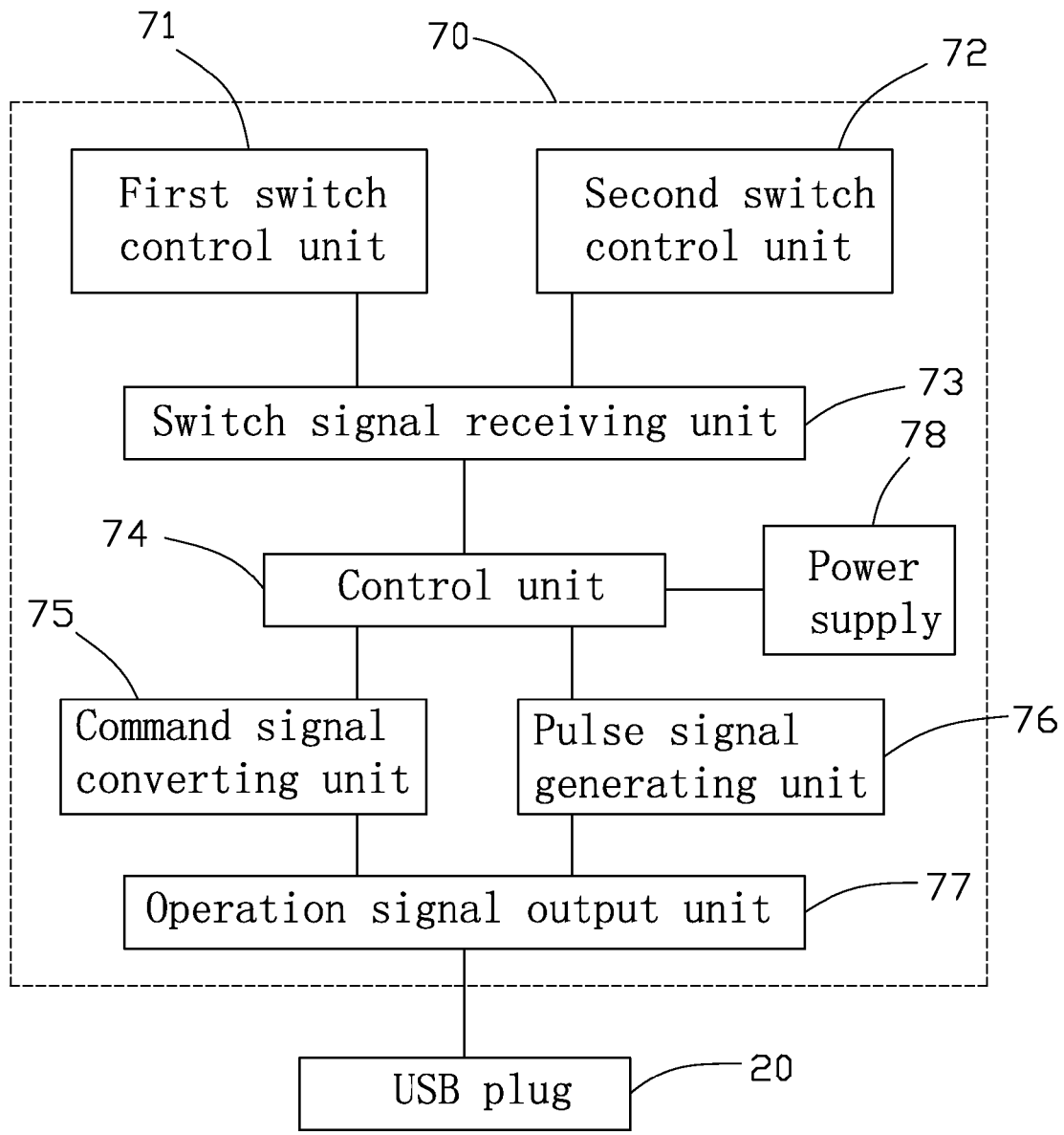
FIG. 4 is a circuit block diagram of the CNC machine control apparatus of FIG. 1, in accordance with an exemplary embodiment.
Figure 5:
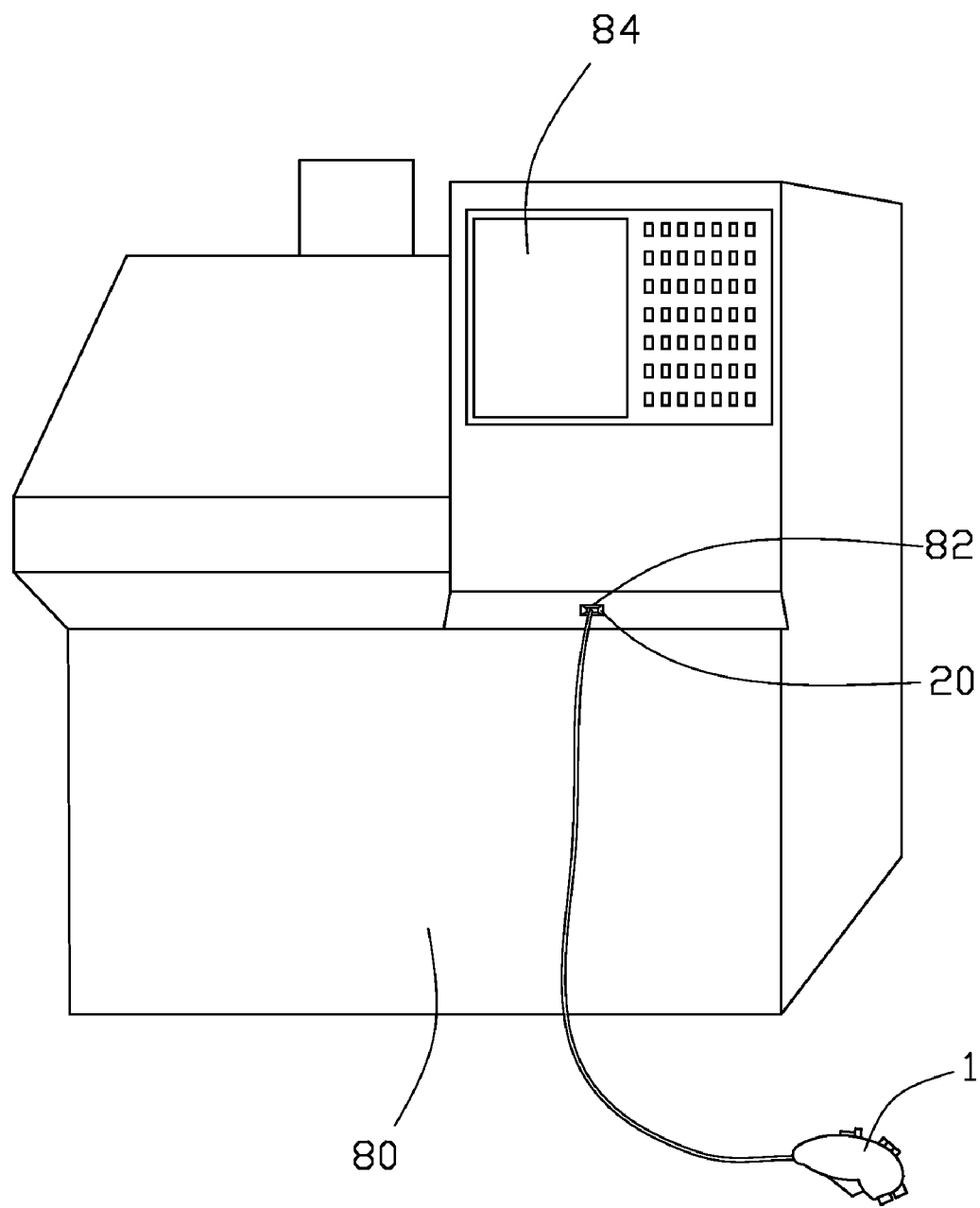
FIG. 5 is a schematic, isometric view of the CNC machine control apparatus of FIG. 1, together with a CNC machine.

Referring to FIGS. 2-5, an exemplary embodiment of a computer numerical control (CNC) machine control apparatus 1 is used to control a CNC machine 80. The CNC machine control apparatus 1 includes a case 10, a universal serial bus (USB) plug 20 connected to a control circuit 70 arranged in the case 10 via cables, a rotary switch 30 mounted on the case 10, and seven button switches 41-44, 51, 52, and 61 mounted on the case 10. In other embodiments, the USB plug 20 can be replaced by some other kinds of communication plug. The rotary switch 30 and the button switches 41-44, 51, 52, and 61 can be replaced by other kinds of switches.

The case 10 is approximately ellipsoid-shaped and defines a depressed portion 12 in a lower side of the case 10. The rotary switch 30 is mounted on an upper side of the case 10, adjacent to a first end of the case 10. The button switches 41-44 are mounted on the upper side of the case 10 in a crisscross mode, adjacent to a second end of the case 10. The button switches 51 and 52 are mounted on the second end of the case 10. The button switch 61 is mounted to the depressed portion 12 of the case 10. The case 10 is easily handheld, and the rotary switch 30 and the button switches 41-44, 51, 52, and 61 are convenient to operate.

The control circuit 70 includes a first switch control unit 71, a second switch control unit 72, a switch signal receiving unit 73, a control unit 74, a command signal converting unit 75, a pulse signal generating unit 76, an operation signal output unit 77, and a power supply 78.

The first switch control unit 71 is to receive a first switch signal from the rotary switch 30 and send the first switch signal to the switch signal receiving unit 73, for controlling a work mode of the CNC machine 80. The second switch control unit 72 is to receive second switch signals from the button switches 41-44, 51, 52, and 61, and send the second switch signals to the switch signal receiving unit 73, for controlling the operation of the CNC machine 80.

In one embodiment, the rotary switch 30 includes five switch points corresponding to five work modes of the CNC machine 80, the switch points include an automatic processing switch point AUTO, a single-line processing switch point SINGLE, a consecutive jog processing switch point CJOG, an equidistance jog processing switch point IJOG, and a mouse processing switch point MOUSE.

When the rotary switch 30 is switched to the automatic processing switch point AUTO or the single-line processing switch point SINGLE, the operation of the CNC machine 80 is controlled by the button switches 41-44, 51, 52, and 61. The button switches 42 and 44 are to control a moving speed of the CNC machine 80, the button switches 41 and 43 are to control a feeding speed of the CNC machine 80, the button switch 51 is to stop the CNC machine 80, the button switch 52 is to reset the CNC machine 80, and the button switch 61 is to start the CNC machine 80. The CNC machine 80 is in an automatic mode when the rotary switch 30 is switched to the automatic processing switch point AUTO, in a single-line mode when the rotary switch 30 is switched to the single-line processing switch point SINGLE.

When the rotary switch 30 is switched to the consecutive jog processing switch point CJOG, the button switches 42 and 44 are to control movement of the CNC machine 80 along an X direction, the button switches 41 and 43 are to control movement of the CNC machine 80 along a Y direction, the button switches 51 and 52 are to control movement of the CNC machine 80 along an Z direction, and the button switch 61 is to control the moving speed of the CNC machine 80. Wherein the X direction, the Z direction, and the Z direction are vertical to one another in a space.

When the rotary switch 30 is switched to the equidistance jog processing switch point IJOG, the button switches 42 and 44 are to control movement of the CNC machine 80 along an X direction, the button switches 41 and 43 are to control movement of the CNC machine 80 along a Y direction, the button switches 51 and 52 are to control movement of the CNC machine 80 along an Z direction, and the button switch 61 is to control a moving distance of each jog of the CNC machine 80, such as 0.1 mm, 0.01 mm, 0.001 mm, etc.

The switch signal receiving unit 73 is to transmit the first and second switch signals to the control unit 74. The power supply 78 supplies power to the control unit 74. The control unit 74 is to determine a current switch point of the rotary switch 30 according to the first switch signal from the rotary switch 30, and convert the second switch signals from the button switches 41-44, 51, 52, and 61 into command signals and then send the command signals to the command signal converting unit 75. The command signal converting unit 75 is to convert the command signals to operation signals which can be identified by the CNC machine 80, and then send the operation signals to the operation signal output unit 77. The pulse signal generating unit 76 is to generate pulse signals to the operation signal output unit 77. The operation signal output unit 77 is to output the operation signals and the pulse signals to the CNC machine 80 via the USB plug 20 of the CNC machine control apparatus 1. In other embodiments, the switch signal receiving unit 73 can be omitted and the control unit 74 has a function to receive the first and second switch signals from the switch control units 71 and 72.

In use, the USB plug 20 of the CNC machine control apparatus 1 is plugged into a corresponding USB interface 82 of the CNC machine 80. When the CNC machine 80 needs to operate in the automatic mode, the rotary switch 30 of the CNC machine control apparatus 1 is switched to the automatic processing switch point AUTO. The button switch 61 is pushed to start the CNC machine 80, and the button switches 42 and 44 can be pushed to control the moving speed of the CNC machine 80, the button switches 41 and 43 can be pushed to control the feeding speed of the CNC machine 80, the button switch 51 can be pushed to stop the CNC machine 80, and the button switch 52 can be pushed to reset the CNC machine 80. When the CNC machine 80 needs to operate in other modes, the rotary switch 30 is switched to the single-line processing switch point SINGLE, the consecutive jog processing switch point CJOG, or the equidistance jog processing switch point IJOG, and the corresponding button switches can be pushed to control the CNC machine 80, which is very convenient.

If the CNC machine 80 has a control interface 84 controlled by a mouse, the rotary switch 30 of the CNC machine control apparatus 1 can be switched to the mouse switch point MOUSE to enable mouse functioning. The button switches 41-44 can be pushed to control movement of a cursor of the control interface 84 of the CNC machine 80, and the button switches 51 and 52 can be pushed to execute a confirmation operation and a cancel operation respectively. The button switch 61 is undefined. Because the CNC machine control apparatus 1 can function as a mouse, a separate mouse is not needed for the CNC machine 80, which saves money. Furthermore, the CNC machine control apparatus 1 also can be used to control another electrical device, such as a computer, as a normal mouse would.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer numerical control (CNC) machine control apparatus, the CNC machine control apparatus comprising:
    a case;
    a communication plug, operable to communicate with a CNC machine;
    a first switch mounted on the case, wherein the first switch comprises a plurality of processing switch points corresponding to a plurality of work modes of the CNC machine, respectively;
    a plurality of second switches mounted on the case, wherein the plurality of second switches perform different functions according to which of the processing switch points of the first switch is chosen; and
    a control circuit arranged in the case, comprising:
        a first switch control unit to receive a first switch signal from the first switch;
        a second switch control unit to receive second switch signals from the plurality of second switches;
        a control unit to receive the first and second switch signals, determine which work mode of the CNC machine is chosen according to the first switch signal, and convert the second switch signals into command signals according to the chosen work mode;
        a command signal converting unit to convert the command signals into operation signals;
        a pulse signal generating unit to generate pulse signals; and
        an operation signal output unit to output the operation signals and the pulse signals to the CNC machine via the communication plug, to control operation of the CNC machine;
    wherein the first switch comprises an automatic processing switch point and/or an single-line processing switch point, the plurality of second switches comprise first to fourth button switches; the second and fourth button switches are operable to control a moving speed of the CNC machine, the first and third button switches are operable to control a feeding speed of the CNC machine, in response to that the first switch is switched to the automatic processing switch point or the single-line processing switch point.

2. The CNC machine control apparatus of claim 1, wherein the control circuit further comprises a switch signal receiving unit, to receive the first and second switch signals from the first and second switch control units and transmit the first and second switch signals to the control unit.

3. The CNC machine control apparatus of claim 1, wherein the first switch is a rotary switch.

4. The CNC machine control apparatus of claim 1, wherein the case is approximately ellipsoid-shaped, the first switch is mounted on an upper side of the case, adjacent to a first end of the case.

5. The CNC machine control apparatus of claim 1, wherein the plurality of second switches further comprises fifth to seventh button switches; the fifth button switch is operable to stop the CNC machine, the sixth button switch is operable to reset the CNC machine, and the seventh button switch is operable to start the CNC machine.

6. The CNC machine control apparatus of claim 5, wherein the case defines a depressed portion in a lower side of the case, the first to fourth button switches are mounted on an upper side of the case, adjacent to an end of the case and in a crisscross mode, the fifth and sixth button switches are mounted to the end of the case, the seventh button switch is mounted in the depressed portion of the case.

7. The CNC machine control apparatus of claim 1, wherein the communication plug is a universal serial bus (USB) plug.

8. A computer numerical control (CNC) machine control apparatus, the CNC machine control apparatus comprising:
    a case;
    a communication plug, operable to communicate with a CNC machine;
    a first switch mounted on the case, wherein the first switch comprises a plurality of processing switch points corresponding to a plurality of work modes of the CNC machine, respectively;
    a plurality of second switches mounted on the case, wherein the plurality of second switches perform different functions according to which of the processing switch points of the first switch is chosen; and
    a control circuit arranged in the case, comprising:
        a first switch control unit to receive a first switch signal from the first switch;
        a second switch control unit to receive second switch signals from the plurality of second switches;

a control unit to receive the first and second switch signals, determine which work mode of the CNC machine is chosen according to the first switch signal, and convert the second switch signals into command signals according to the chosen work mode;

a command signal converting unit to convert the command signals into operation signals;

a pulse signal generating unit to generate pulse signals; and an operation signal output unit to output the operation signals and the pulse signals to the CNC machine via the communication plug, to control operation of the CNC machine;

wherein the first switch comprises a consecutive jog processing switch point and/or a equidistance jog processing switch point, the plurality of second switches comprise first to sixth button switches; the second and fourth button switches are operable to control movement of the CNC machine along an X direction, the first and third button switches are operable to control movement of the CNC machine along a Y direction, the fifth and sixth button switches are operable to control movement of the CNC machine along an Z direction, wherein the X direction, the Z direction, and the Z direction are vertical to one another, in response to that the first switch is switched to the consecutive jog processing switch point or the equidistance jog processing switch point.

9. The CNC machine control apparatus of claim 8, wherein the plurality of second switches further comprise a seventh button switch, the seventh button switch is to control the speed of the CNC machine, in response to that the first switch is switched to the consecutive jog processing switch point.

10. The CNC machine control apparatus of claim 8, wherein the plurality of second switches further comprise a seventh button switch, the seventh button switch is to control a moving distance of each jog of the CNC machine, in response to that the first switch is switched to the equidistance jog processing switch point.

11. The CNC machine control apparatus of claim 8, wherein the case defines a depressed portion in a lower side of the case, the first to fourth button switches are mounted on an upper side of the case, adjacent to an end of the case and in a crisscross mode, the fifth and sixth button switches are mounted to the end of the case, the seventh button switch is mounted in the depressed portion of the case.

12. The CNC machine control apparatus of claim 8, wherein the communication plug is a universal serial bus (USB) plug.

13. A computer numerical control (CNC) machine control apparatus, the CNC machine control apparatus comprising:

a case;

a communication plug, operable to communicate with a CNC machine;

a first switch mounted on the case, wherein the first switch comprises a plurality of processing switch points corresponding to a plurality of work modes of the CNC machine, respectively;

a plurality of second switches mounted on the case, wherein the plurality of second switches perform different functions according to which of the processing switch points of the first switch is chosen; and a control circuit arranged in the case, comprising:

a first switch control unit to receive a first switch signal from the first switch;

a second switch control unit to receive second switch signals from the plurality of second switches;

a control unit to receive the first and second switch signals, determine which work mode of the CNC machine is chosen according to the first switch signal, and convert the second switch signals into command signals according to the chosen work mode;

a command signal converting unit to convert the command signals into operation signals;

a pulse signal generating unit to generate pulse signals; and an operation signal output unit to output the operation signals and the pulse signals to the CNC machine via the communication plug, to control operation of the CNC machine;

wherein the first switch comprises a mouse processing switch point, the plurality of second switches comprise first to sixth button switches; the first to fourth button switches are operable to control movement of a cursor of a control interface of the CNC machine, the fifth and sixth button switches are operable to execute a confirmation operation and a cancel operation, in response to that the first switch is switched to the mouse processing switch point.

14. The CNC machine control apparatus of claim 13, wherein the case defines a depressed portion in a lower side of the case, the first to fourth button switches are mounted on an upper side of the case, adjacent to an end of the case and in a crisscross mode, the fifth and sixth button switches are mounted to the end of the case.

15. The CNC machine control apparatus of claim 13, wherein the communication plug is a universal serial bus (USB) plug.

* * * * *